April 13, 1937.      G. H. THOMAS      2,076,752
FLEXIBLE COUPLING
Filed July 1, 1935
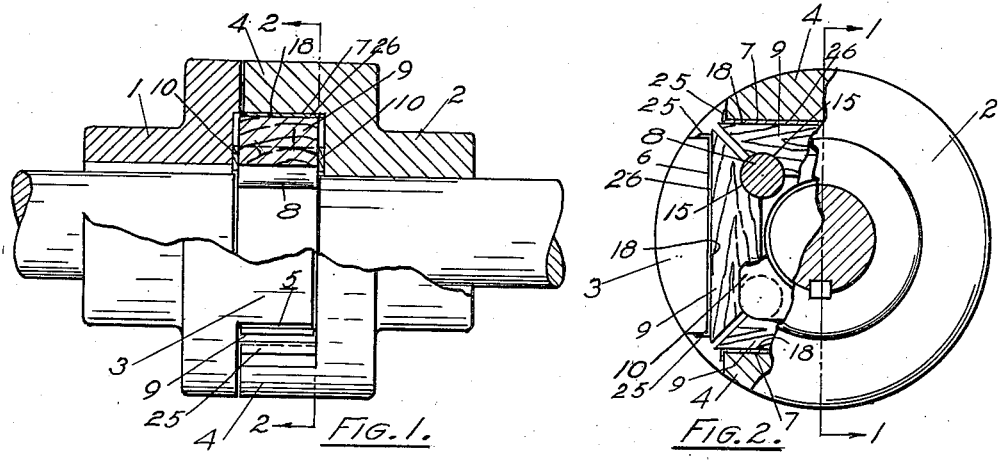
INVENTOR.
George H. Thomas
BY
Florian G. Miller
ATTORNEY.

Patented Apr. 13, 1937

2,076,752

UNITED STATES PATENT OFFICE 2,076,752

FLEXIBLE COUPLING

George H. Thomas, Erie, Pa.

Application July 1, 1935, Serial No. 29,226

10 Claims. (Cl. 64—31)

This invention relates to shaft couplings and more particularly to shaft couplings by which power can be transmitted from one shaft to another when said shafts are misaligned angularly, off-center, or both; and also to permit substantial endwise and rotational movement.

All devices of this particular type made according to the teachings of the prior art and with which I am familiar, have been so constructed that great force was exerted on a small area of the coupling member as well as on a small area of the jaws of the driving and driven members which it engaged. This wear on a localized area shortened the life of the coupling considerably besides causing the coupling to become very noisy in a very short time.

It is, therefore, the principal object of my invention to provide a coupling member whose outer bearing surfaces remain in parallel relation with the bearing surfaces of the jaws in which it is in engagement to provide a more equal distribution of the bearing surfaces on both the coupling member and the jaws of the driving and driven members.

Another object of my invention is to provide a coupling member which is easy to manufacture and maintain, cheap in cost, and simple in construction.

Another object of my invention is to provide a coupling member having its outer bearing surfaces capable of assuming various angles with respect to its adjacently disposed bearing surfaces.

Another object of my invention is to provide a coupling member having independently moving sides capable of assuming various angles with relation to its adjacently assembled sides.

Another object of my invention is to provide a coupling member for a flexible coupling whose bearing surfaces move independently of one another and in parallel relation to the bearing surfaces of the jaws in which they are in contact.

Other objects of my invention will become evident from the following detailed description, taken in conjunction with the accompanying drawing, in which Fig. 1 is a view in side elevation partly in section showing my novel coupling member in assembled position.

Fig. 2 is an end elevational view partly in section of my novel coupling member.

Fig. 3 is a fragmentary view in side elevation of my novel invention in a position for quick assembly.

Fig. 4 is a perspective view showing the construction of the spaced pivot posts in my coupling member.

Fig. 5 is a perspective view of the bearing blocks used in my coupling member.

Fig. 6 is a perspective view of another form of construction for the spaced pivot posts in my coupling member.

Fig. 7 is an end elevational view of a cross-section taken through the center of the construction shown in Fig. 6.

Fig. 8 is a perspective view of the grooved bearing blocks used with the pivot post construction shown in Fig. 6.

Referring to the drawing, the members shown in Figs. 1 and 2 comprise a complementary driving member 1 and a driven member 2 having projecting integral jaws 3 and 4. A coupling member 5 is disposed between the bearing surfaces 6 and 7 of the jaws 3 and 4 to prevent any substantial relative rotation of the driving member 1 and the driven member 2. Bearing strips 26 having flanged ends 25 are shown mounted on the bearing surfaces 6 and 7 of the jaws 3 and 4. It will be understood that these may be used or eliminated at will.

The coupling member 5, which is the gist of the present invention, comprises four equally spaced pivot posts 8 and four independently movable bearing blocks 9. Although four spaced pivot posts 9 are shown and described as the preferred form of my invention, it will be understood that any number of pivot posts can be used with a corresponding number of bearing blocks. The bearing blocks 9 are made of lubricant impregnated wood, lignum vitae, or any other suitable material which would require no lubricant. Any other material such as a metal might be used and a lubricant provided.

Any suitable form of construction may be used to secure the pivot posts 8 in spaced relation. Two forms of construction are represented in Figs. 4 and 6 of the drawing. The construction shown in Fig. 4 shows the posts 8 held in spaced relation by parallel plates 10. The posts 8 may be secured to the plates 10 by any suitable means such as welding. The construction shown in Fig. 6 shows the posts 8 held in spaced relation by flanges 11 reinforced by a web 12. In this construction a projecting tongue 13 is disposed on the outer portion of the flanges 11 for engagement with grooves 14 in the bearing blocks 9 as shown in Fig. 8 to prevent lateral movement of the blocks 9 relative to one another. The bearing blocks 9 also have two laterally extending semi-circular grooves 15 disposed in the inner end portions of the blocks 9 and are disposed at such a distance apart that they will engage the pivot posts 8 and pivot thereabout upon excess pressure being exerted away from the center of the blocks 9. The ends 16 of the bearing blocks 9 are bevelled at approximately a forty-five degree angle in order that the four blocks 9 will form a substantial square when in their normally assembled position. The outer bearing surfaces 18 of the bearing blocks 9 engages the bearing surfaces 6 and 7 of the jaws 3 and 4 and remain in substantial parallel relation thereto at all times.

In operation, the bearing blocks 9 are positioned on the pivot posts 8 with the semi-circular grooves 15 in engagement with the posts 8 and the assembled construction is placed between the bearing surfaces 6 and 7 of the jaws 3 and 4 on the driving and driven members 1 and 2. It will be apparent from the drawing that the driving and driven members 1 and 2 are interchangeable and therefore the coupling operates equally well in both directions. When the driving member 1 begins to rotate, its jaws 3 engage the bearing blocks 9 of the coupling member 5. The greatest force is always exerted by the bearing surfaces 6 of the jaws 3 on the side in the direction in which the coupling member 5 is moving which causes localized forces to be exerted on diagonally opposite corners of the coupling member 5. This localized force on one side of the bearing blocks 9 causes the block 9 to pivot about the post 8 where the localized force is being exerted. This pivoting movement of the block 9 permits the bearing surfaces 6 of the blocks 9 to remain in substantial parallel relation with the bearing surface 6 of the jaws 3 in which it is in engagement to cause a more equal distribution of the bearing forces over the whole area of the bearing surfaces 6 of the jaws 3 as well as the bearing surfaces 18 of the blocks 9. It will be apparent that the bearing surfaces 7 of the jaws 4 on the driven member 2 upon resisting the driving force of the driven member 1 will tend to exert a localized force on one side of the bearing surfaces 18 of the blocks 9 in which they are in contact. The pivoting movement of the bearing blocks 9 about the posts 8 due to the localized force on one end of the bearing surface 18 of the blocks 9 will likewise keep the bearing surfaces 18 of the blocks 9 in parallel relation with the bearing surfaces 7 of the jaws 4 in which they are in engagement as described above to cause a more equal distribution of the bearing forces over the bearing surfaces 7 and 18 of the jaws 4 and blocks 9.

It will be apparent from the above description that I have provided a coupling member which is economical in manufacture, maintenance, and original cost, and which has bearing surfaces which remain in substantial parallel relation with the engaging bearing surfaces of the jaws in which they are in contact to increase the area over which the driving force is exerted causing increased life, more efficient operation, and a minimum of noise.

Various changes may be made in specific embodiment of the present invention without diverting from the spirit thereof, or within the scope of the appended claims.

What I claim is:

1. An intermediate coupling member comprising spaced pivot posts, and bearing blocks engaging said pivot posts whose outer surfaces normally form a square but being movable independently of their adjacently assembled bearing blocks.

2. A floating coupling member comprising a plurality of posts, means for holding said posts in spaced relation, and bearing blocks engaging said posts and normally forming a square pivoting on engaging pivot posts to change their angular position.

3. A floating coupling member comprising spaced posts, means for securing said posts in spaced relation, a tongue projecting from said securing means, grooved bearing blocks engaging said tongue and said posts and being pivotally mounted thereon to change their angular position with relation to adjacently assembled bearing blocks.

4. In a device of the class described, in combination, complementary driving and driven members, jaws on said driving and driven members having inner bearing surfaces in substantial parallel relation with oppositely disposed inner bearing surfaces, and a coupling member engaging the bearing surfaces of said jaws comprising spaced pivot posts, and bearing blocks engaging said posts pivotally mounted thereon having bearing surfaces in engagement with the bearing surfaces of said jaws and adapted to remain parallel therewith.

5. A device of the class described, in combination, driving and driven members, jaws on said driving and driven members having inner bearing surfaces in substantial parallel relation to the oppositely disposed inner bearing surfaces, and a coupling member having bearing surfaces adapted to move independently and remain in parallel relation with inner bearing surfaces of said jaws comprising spaced posts, and bearing blocks pivotally mounted on said posts and movable thereabout upon rotation of said driving and driven members.

6. A device of the class described, in combination, a driving and a driven member, jaws having inner bearing surfaces in substantial parallel relation with the oppositely disposed inner bearing surfaces on said driving and driven members, and a coupling member engaging the inner surfaces of said jaws comprising equally spaced pivot posts, and independently movable bearing blocks having the grain thereof extending longitudinally tiltably mounted on said posts in parallel relation to said inner surfaces of said jaws.

7. A device of the class described, in combination, a driving and a driven member, jaws having inner bearing surfaces in substantial parallel relation with the oppositely disposed inner bearing surfaces on said driving and driven members, and a coupling member having independently movable side bearing surfaces engaging said inner surfaces of said jaws comprising spaced pivot posts, and movable bearing blocks having semi-circular grooves for engagement with said pivot posts and being movable about said posts as a pivot upon movement of said driving and driven members.

8. A device of the class described, in combination, a driving and a driven member, jaws having inner bearing surfaces in substantial parallel relation with the oppositely disposed inner bearing surfaces on said driving and driven members, and a normally square coupling member having sides movable independently to various angled positions with relation to their adjacently assembled sides comprising spaced posts, and bearing blocks movable about said posts as a pivot upon localization of the bearing forces near said posts.

9. In a device of the class described, in combination, a driving and a driven member, jaws having inner bearing surfaces in substantial parallel relation with the oppositely disposed inner bearing surfaces on said driving and driven members, and a coupling member engaging the inner surfaces of said jaws and being self-lubricating having independently movable sides movable to various angled positions with relation to adjacent sides to remain in parallel relation with the inner surfaces of said jaws.

10. A coupling member for a jaw coupling comprising pivot posts, and independently movable bearing blocks engaging said pivot posts forming a polygonal sided block member.

GEORGE H. THOMAS.